US00RE39686E

(19) United States
(12) Reissued Patent
Khoshnood

(10) Patent Number: US RE39,686 E
(45) Date of Reissued Patent: Jun. 12, 2007

(54) AMBIENT LIGHT COLLECTING BOW SIGHT

(76) Inventor: Bahram Khoshnood, 2735 Two Rock Ct., Alpharetta, GA (US) 30004

(21) Appl. No.: 10/835,580

(22) Filed: Apr. 29, 2004

Related U.S. Patent Documents

Reissue of:
(64) Patent No.: 6,601,308
Issued: Aug. 5, 2003
Appl. No.: 10/040,151
Filed: Jan. 2, 2002

(51) Int. Cl.
*F41G 1/467* (2006.01)

(52) U.S. Cl. ..... 33/265; 124/87; 42/123; 42/131; 42/132

(58) Field of Classification Search ..... 33/265; 124/87; 42/131–132, 123
See application file for complete search history.

(56) References Cited

U.S. PATENT DOCUMENTS 3,977,974 A * 8/1976 Pelton ..... 210/202
3,997,974 A 12/1976 Larson
4,177,572 A 12/1979 Hindes (Continued)

FOREIGN PATENT DOCUMENTS

| | | | |
|---|---|---|---|
| EP | 0 459 763 | * | 12/1991 |
| EP | 0 532 314 | * | 3/1993 |
| JP | 59-028327 | * | 2/1984 |
| JP | 59-065479 | * | 4/1984 |
| JP | 59-182517 | * | 10/1984 |
| JP | 63-190386 | * | 8/1988 |
| JP | 02-140915 | * | 5/1990 |
| JP | 02-222546 | * | 9/1990 |
| JP | 03-185736 | * | 8/1991 |
| JP | 04-037168 | * | 2/1992 |
| JP | 04-111361 | * | 4/1992 |
| JP | 04-165679 | * | 6/1992 |
| JP | 05-055581 | * | 3/1993 |
| JP | 05-175506 | * | 7/1993 |
| JP | 06-013610 | * | 1/1994 |
| JP | 07-161996 | * | 6/1995 |

OTHER PUBLICATIONS

Cobra Bowhunting Products, "2003 Product Catalog", Cobra Manufacturing Co., Inc., Bixby, OK.
Trophy Ridge, "2003 Catalog", Trophy Ridge, LLC, Belgrade, MT.
TRUGLO, "2003 Catalog", TRUGLO, Inc., McKinney, TX.
TRUGLO, "2001 Catalog", TRUGLO, Inc., McKinney, TX.
ARROWTRADE (magazine), "Bow Tech" Jan. (2004), p. 4, ARROWTRADE, Braham, MN.
Inside Archery (magazine), "Vital Bow Gear", Jun. (2004), p. 61.
BOWHUNTING, "bowhuntingmag.com", Sep. (2004).
Vital Bow Gear, "http://www.vitalbowgear.com/tombstone.cfm".
Bahram Khoshnood, Impact Archery, flyer/advertisement, 1 page, Tennessee, U.S.A., 1999.
Photograph of Xerox 7020/7021 Cartridge carrying a label 1011439. (no date).*
Photograph of Muratec F60 Cartridge carrying a label 1011436. (no date).*

*Primary Examiner*—Yaritza Guadalupe-McCall
(74) *Attorney, Agent, or Firm*—Myers & Kaplan, LLC; Ashish D. Patel, Esq.; George Bonanto, Esq.

(57) ABSTRACT

An ambient light collecting bow sight having a light collecting filament, wherein the light collecting filament is preferably a scintillating fiber optic filament of sufficient length to enable extensive wrapping or winding of the fiber optic filament around a preferably translucent bow sight. The multiple wrapping or winding of an extensive strand of fiber optic filament provides the filament with more surface area in which to harness ambient light passing through the translucent bow-sight. A portion of the fiber optic filament is attached to a pin or crosshair of the bow sight, thus functioning as a lit targeting pin.

21 Claims, 6 Drawing Sheets

U.S. PATENT DOCUMENTS

| | | | | |
|---|---|---|---|---|
| 4,220,983 | A | | 9/1980 | Schroeder |
| 4,534,820 | A | * | 8/1985 | Mori et al. |
| 4,535,544 | A | | 8/1985 | Jones et al. |
| 4,875,144 | A | | 10/1989 | Wainwright |
| 4,977,677 | A | | 12/1990 | Troescher, Jr. |
| 5,121,547 | A | | 6/1992 | Littlejohn |
| 5,164,805 | A | * | 11/1992 | Lee |
| 5,168,631 | A | | 12/1992 | Sherman |
| 5,174,269 | A | | 12/1992 | Sappington |
| 5,231,765 | A | | 8/1993 | Sherman |
| 5,253,423 | A | | 10/1993 | Sullivan, Jr. et al. |
| 5,255,440 | A | | 10/1993 | Rogers |
| 5,341,791 | A | | 8/1994 | Shafer |
| 5,442,861 | A | | 8/1995 | Lorocco |
| 5,523,240 | A | * | 6/1996 | Zhang et al. |
| 5,560,113 | A | | 10/1996 | Simo et al. |
| 5,579,033 | A | | 11/1996 | Rutledge et al. |
| 5,634,278 | A | | 6/1997 | London |
| 5,649,526 | A | | 7/1997 | Ellig |
| 5,671,724 | A | | 9/1997 | Priebe |
| 5,731,613 | A | * | 3/1998 | Yamazaki et al. |
| 5,791,060 | A | | 8/1998 | Godsey |
| 5,850,700 | A | | 12/1998 | Capson et al. |
| 5,862,603 | A | | 1/1999 | Ellig |
| 5,956,854 | A | | 9/1999 | Lorocco |
| 5,975,069 | A | | 11/1999 | Hamm et al. |
| 5,996,569 | A | | 12/1999 | Wilson |
| 6,000,141 | A | | 12/1999 | Afshari |
| 6,016,608 | A | | 1/2000 | Lorocco |
| 6,073,352 | A | | 6/2000 | Zykan et al. |
| 6,199,286 | B1 | | 3/2001 | Reed, Jr. et al. |
| 6,311,405 | B1 | | 11/2001 | Slates |
| 6,418,633 | B1 | | 7/2002 | Rager |
| 6,601,308 | B2 | | 8/2003 | Khoshnood |

* cited by examiner

AMBIENT LIGHT COLLECTING BOW SIGHT

Matter enclosed in heavy brackets [ ] appears in the original patent but forms no part of this reissue specification; matter printed in italics indicates the additions made by reissue.

TECHNICAL FIELD

The present invention relates generally to bow sights, and more specifically to an ambient light collecting bow sight. The present invention is particularly useful in, although not limited to, assisting hunters and/or competition shooters equipped with bows and/or firearms to target game or objects in low-light environments.

BACKGROUND OF THE INVENTION

Effective and successful use of a bow is dependent upon a multitude of variables, including establishment of proper trajectory, string tension, drawback and even the weight of the bow. More importantly, however, the precision of a bowshot is largely dependent upon proper targeting or aiming and the ability to sight one's target. As such, many archers/hunters have employed the use of bow sights to assist in such targeting. Unfortunately, however, because most hunting expeditions are usually conducted in low-level light conditions/environments, such as a dense forest, most conventionally available bow sights are unable to effectively assist the hunter in sighting his target.

Although attempts have been made to cure the deficiencies and inadequacies of conventional sighting pins and/or crosshairs, simple bow sights of this sort are of limited use because they fail to provide the archer/hunter with the requisite amount of light needed to sight a target within the bow sight. Furthermore, while bow sights with small light collecting filaments are known, they too serve limited use as they are typically unable to harness enough ambient light to make use of the bow sight worthwhile.

Therefore, it is readily apparent that there is a need for an ambient light collecting bow sight, wherein the bow sight is able to effectively harness diminutive amounts of ambient light and magnify it to a useable light source capable of assisting hunters in sighting their targets in low-light environments.

BRIEF SUMMARY OF THE INVENTION

Briefly described, in a preferred embodiment, the present invention overcomes the above-mentioned disadvantage, and meets the recognized need for such a device by providing an ambient light collecting bow sight, wherein the bow sight is able to effectively harness diminutive amounts of ambient light and magnify it to a useable light source capable of assisting hunters in sighting their targets in low-light environments.

According to its major aspects and broadly stated, the present invention in its preferred form is an ambient light collecting bow sight having a light collecting filament.

More specifically, the present invention is an ambient light collecting bow sight having a light collecting filament, wherein the light collecting filament is preferably a scintillating fiber optic filament of sufficient length to enable extensive wrapping or winding of the fiber optic filament around a preferably translucent bow sight. The repeated wrapping or winding of the lengthy strand of fiber optic filament configures the filament to provide increased surface area with which to harness ambient light. The translucent material from which the actual bow sight is constructed further enables ambient light to pass therethrough and thus to be harnessed by the wrapped filament. A portion of the fiber optic filament is attached to a pin or crosshair of the bow sight, thus functioning as a lit targeting pin.

A feature and advantage of the present invention is its ability to provide a lit bow sight.

A feature and advantage of the present invention is its ability to be used in extremely low-level light environments.

A feature and advantage of the present invention is its ability to effectively harness ambient low-level light and magnify it to a useable light source.

A feature and advantage of the present invention is its ability to allow the archer/hunter to sight targets in low-level light environments.

A feature and advantage of the present invention is its ability to provide a large ambient light collecting surface area.

A feature and advantage of the present invention is its portability.

A feature and advantage of the present invention is its ease of use.

A feature and advantage of the present invention is its ability to provide a rotatable or adjustable bow sight.

These and other objects, features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND ALTERNATIVE EMBODIMENTS

In describing the preferred and alternate embodiments of the present invention, as illustrated in FIGS. 1–9, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
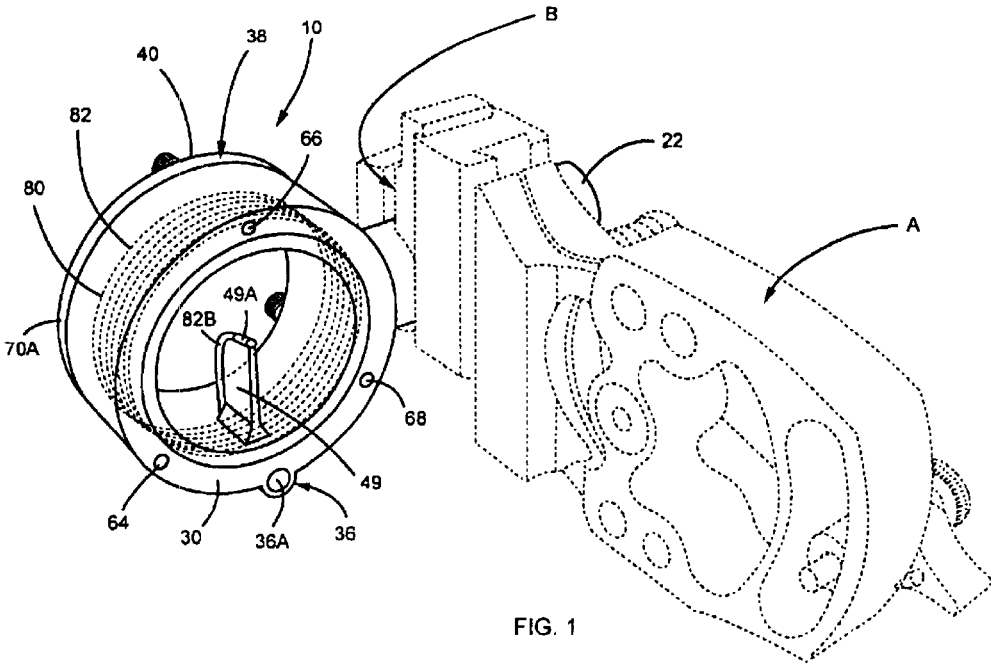
FIG. 1 is a front perspective view of an ambient light collecting bow sight according to a preferred embodiment of the present invention.
Figure 2:
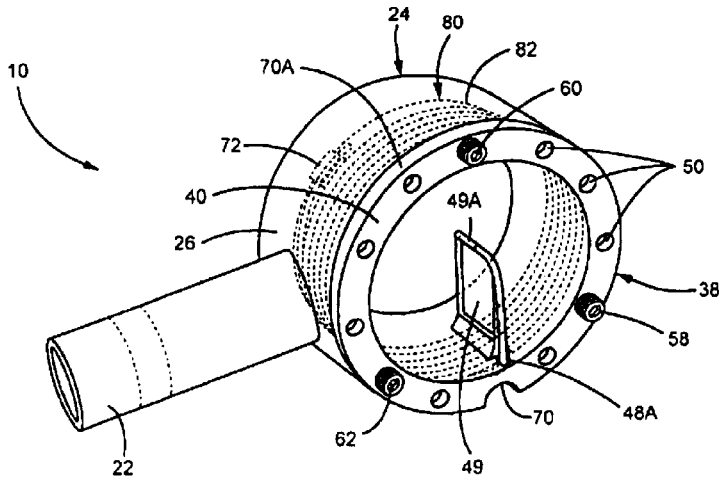
FIG. 2 is a rear perspective view of an ambient light collecting bow sight according to a preferred embodiment of the present invention.
Figure 3:
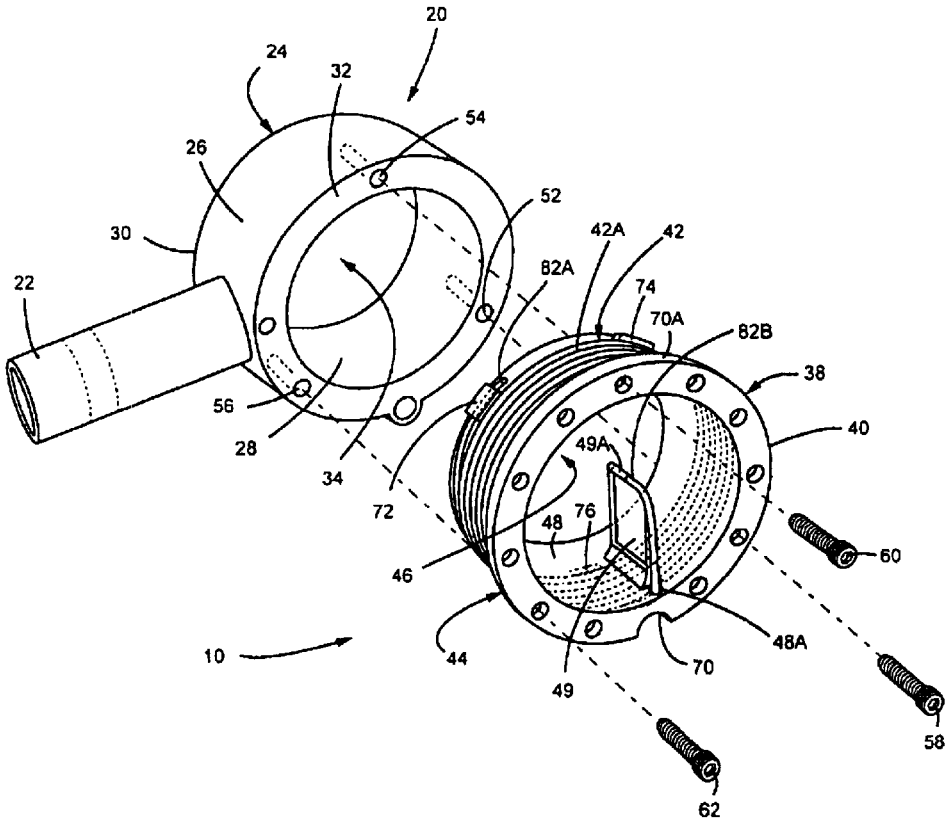
FIG. 3 is an exploded view of an ambient light collecting bow sight according to a preferred embodiment of the present invention.

Referring now to FIGS. 1–3, the present invention in its preferred embodiment is an ambient light collecting bow sight 10 having bow sight 20 and light collecting mechanism 80.

Specifically, bow sight 20 has preferably cylindrical shaft 22 integrally formed to ring 24. Although integral formation of shaft 22 is preferred, one skilled in the art would readily recognize that shaft 22 could attach to ring 24 via any attaching means known within the art, such as, for exemplary purposes only, epoxies or resins. Shaft 22 is preferably dimensioned to be received within an aperture B in bow sight support A, wherein bow sight support A is any conventional bow sight support known within the art. It is anticipated that the dimensions and/or shape of shaft 22 could be modified to enable reception by other types or configurations of bow sight supports. Bow sight 20 is preferably formed from a sturdy transparent plastic to allow light to pass therethrough to be harnessed by light collecting mechanism 80; however, other suitable non-opaque materials can be used for bow sight 20.

Ring 24 preferably possesses outer wall 26 and inner wall 28 joined to front wall 30 and rear wall 32, wherein inner wall 28 defines aperture 34. Outer wall 26 preferably possesses hump 36, wherein hump 36 has throughhole 36A formed therethrough for receiving a conventional bow leveler as known within the art.

Ring 24 is preferably dimensioned to receive insert 38, wherein insert 38 preferably possesses outer ring 40 preferably integrally formed to inner ring 42 or attached thereto via any attaching means known within the art, such as, for exemplary purposes only, epoxies or resins. Inner ring 42 is preferably of reduced diameter relative to outer ring 40, thus forming area 44, wherein inner ring 42 is preferably dimensioned to be received within aperture 34 of ring 24. Preferably, outer and inner rings 40 and 42, respectively, share a common aperture 46, defined by shared inner wall 48, wherein inner wall 48 preferably has sighting pin 49 integrally formed thereto or attached thereto via any attaching means known within the art, such as, for exemplary purposes only, epoxies or resins.

Area 44 of outer ring 40 preferably has a plurality of throughholes 50 formed therethrough, wherein any one of the plurality of throughholes 50 preferably aligns with any one of threaded holes 52, 54 or 56 formed on back wall 32 of ring 24. As such, when inner ring 42 is inserted into aperture 34 of ring 24, area 44 generally abuts and is substantially flush with back wall 32 of bow sight 20. Rotation of insert 38 enables sighting pin 49 to be positioned at any desired angle, whereupon the selected position of insert 38 in general is preferably maintained via the insertion of each of screws 58, 60 and 62 through one throughhole of the plurality of throughholes 50 on area 44 and thereafter into respective threaded holes 52, 54 and 56 of back wall 32 of ring 24. Front wall 30 of ring 24 preferably has formed thereon additional threaded holes 64, 66 and 68 for attachment of insert 38 to front wall 30 for situations requiring a left-hand oriented bow sight 20. Although front and back walls 30 and 32, respectively, of ring 24 preferably each possess three threaded holes formed thereon, it is contemplated in alternate embodiments that front and back walls 30 and 32, respectively, could define any number of threaded holes, and that holes could be limited to only one of walls 30 or 32.

Outer ring 40 preferably defines indentation 70 defined along outer peripheral wall 70A of outer ring 40, wherein indentation 70 preferably enables insertion of a common bow sight leveler into throughhole 36A of hump 36 of ring 24 when insert 38 is positioned with ring 24.

Light collecting mechanism 80 is preferably a substantially long strand of scintillating ambient light collecting fiber optic filament 82, preferably wrapped a plurality of times around the circumference of outer wall 42A of inner ring 42, wherein outer wall 42A preferably has formed thereon generally equally spaced retention guards 72, 74 and 76 that preferably prohibit the coiled/wrapped fiber optic filament 82 from sliding off from outer wall 42A of inner ring 42. Retention guard 72 preferably possesses throughhole 72A formed therethrough for receiving and retaining first end 82A of fiber optic filament 80, wherein opposing second end 82B of fiber optic filament 80 is preferably fed through throughhole 48A formed at the base of sighting pin 49 and thereafter secured to the tip of sighting pin 49 via insertion of end 82B through retaining throughhole 49A formed on sighting pin 49. Moreover, when insert 38 is brought into contact with ring 24 such that inner ring 42 of insert 38 recesses within aperture 34 of ring 24, fiber optic filament 82 is preferably enclosed or generally encased within the confines created by outer wall 42A of inner ring 42 butting up against inner wall 28 of ring 24.

A generally long wrapped strand of fiber optic filament 82 is preferably utilized as light collecting mechanism 80, wherein the plurality of coils and/or wrappings of fiber optic filament 82 around outer wall 42A of inner ring 40 promote a greater surface area in which to capture ambient light passing through transparent ring 24. As such, light from all directions is harnessed from all around fiber optic filament 82, thus increasing, magnifying and generally enhancing the output of useful light from light collecting mechanism 80. Furthermore, fiber optic filament 82 preferably emits green, yellow and/or amber light upon harnessing the ambient light, wherein different colors of fiber optic filaments are known within the art and may be utilized in alternate embodiments.

Figure 4:
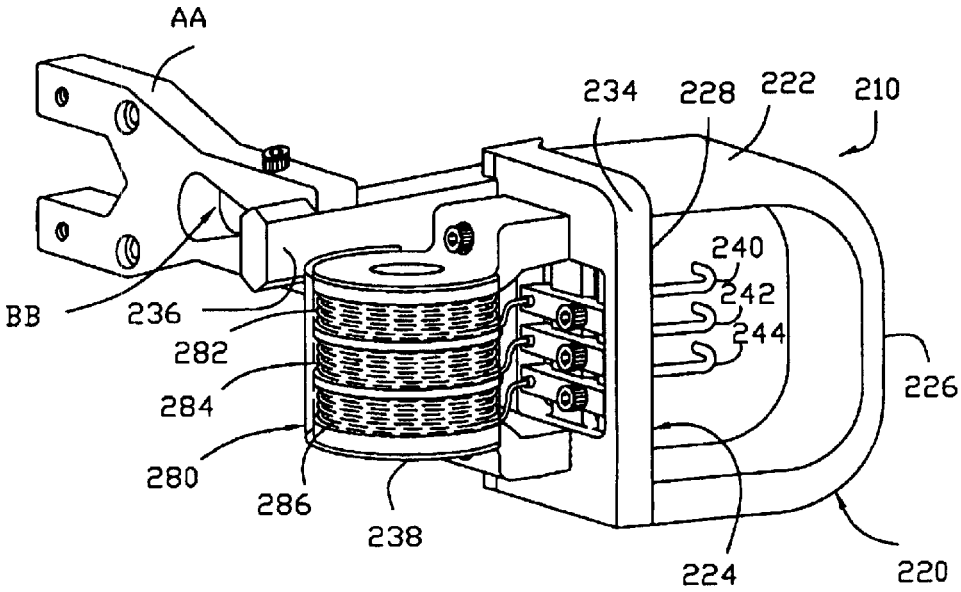
FIG. 4 is a front perspective view of an ambient light collecting bow sight according to an alternate embodiment of the present invention.
Figure 5:
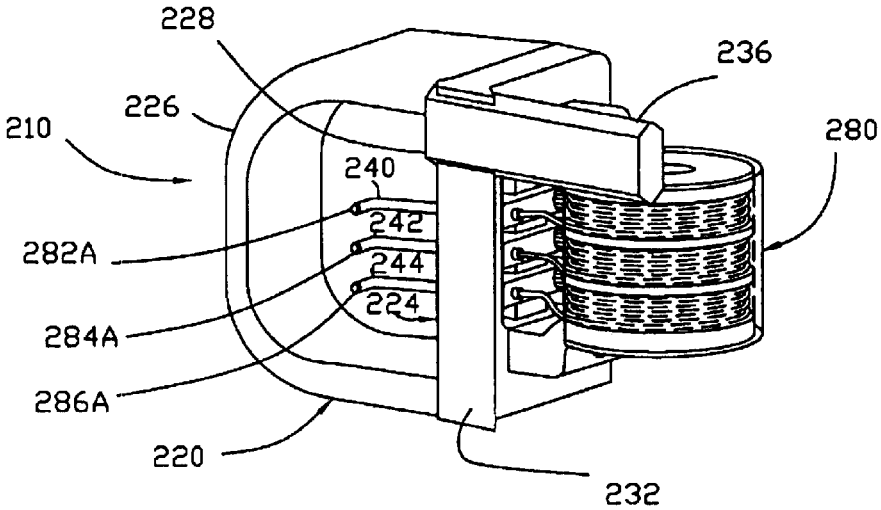
FIG. 5 is a rear perspective view of an ambient light collecting bow sight according to an alternate embodiment of the present invention.
Figure 6:
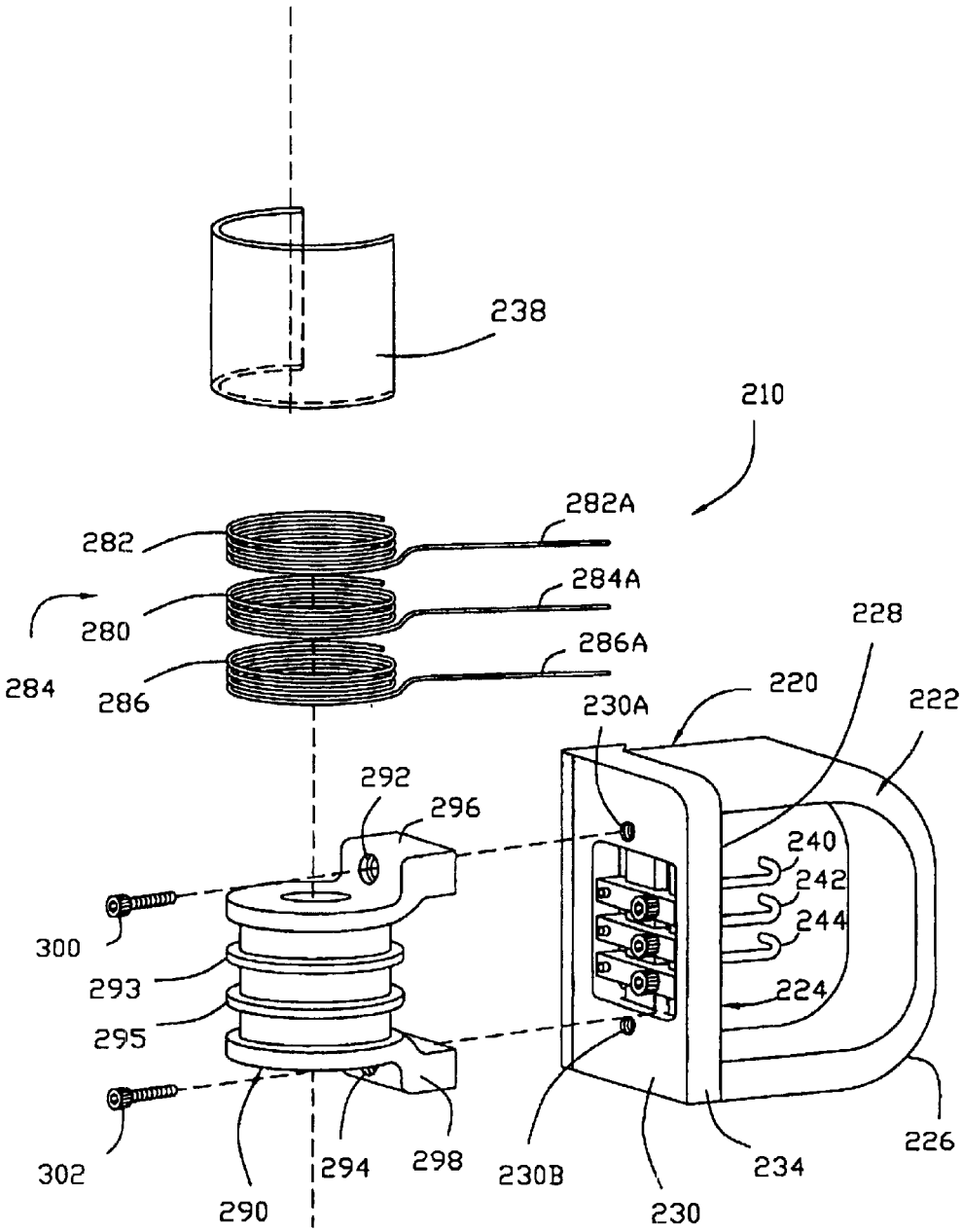
FIG. 6 is an exploded view of an ambient light collecting bow sight according to an alternate embodiment of the present invention.

Referring now to FIGS. 4–6, the present invention according to an alternate embodiment is an ambient light collecting bow sight 210 having bow sight 220 and light collecting mechanism 280.

Specifically, bow sight 220 preferably has generally D-shaped ring 222, wherein D-shaped ring 222 preferably has first wall 224 and curved second wall 226, and wherein first wall 224 preferably has front surface 228, back surface 230 and side walls 232 and 234. Side wall 232 of first wall 224 preferably has substantially rectangular shaped shaft 236 integrally formed therewith or attached thereto via any attaching means known within the art, such as, for exemplary purposes only, epoxies or resins. Shaft 236 is preferably dimensioned to be received within an aperture BB in bow sight support AA, wherein bow sight support AA is any conventional bow sight support known within the art. Furthermore, bow sight 220 is preferably formed from a sturdy transparent plastic so as to allow light to pass therethrough to be harnessed by light collecting mechanism 280; however, other suitable non-opaque materials can be used.

Preferably, generally barrel-shaped filament support 290, having substantially rectangular shaped support arms 296 and 298 opposingly attached thereto, is attached to back surface 230 of first wall 224 preferably via the insertion of screws 300 and 302 through throughholes 292 and 294 of support arms 296 and 298, respectively, and into holes 230A and 230B of back wall 230, wherein filament support 290 preferably supports light collecting mechanism 280.

Light collecting mechanism 280 preferably includes three generally long coiled strands of scintillating ambient light collecting fiber optic filaments 282, 284 and 286. Each of filaments 282, 284 and 286 is preferably wound around filament support 290, wherein generally equally spaced flanges 293 and 295 encircle filament support 290 and function to substantially separate filaments 282, 284 and 286 from one another. Filament support 290 is preferably formed from a sturdy transparent plastic so as to allow light to pass therethrough to be harnessed by the coiled fiber optic filaments 282, 284 and 286; however, other suitable non-opaque materials can be used. Filaments 282, 284 and 286 wrapped around filament support 290 are preferably substantially shielded by a semi-circular shaped encasement 238, wherein encasement 238 is also preferably formed from a sturdy transparent plastic so as to allow light to pass therethrough to be harnessed by the coiled fiber optic filaments 282, 284 and 286 of light collecting mechanism 280; however, other suitable non-opaque materials can also be utilized.

Ends 282A, 284A and 286A of filaments 282, 284 and 286 preferably extend from filament support 290, through first wall 224 and into preferably three generally hollow sighting pins 240, 242 and 244, respectively. As such, ends 282A, 284A and 286A of fiber optic filaments 282, 284 and 286, respectively, are visible from the ends of hollow sighting pins 240, 242 and 244, respectively, and serve as lit sighting pins upon the capture of ambient light by fiber optic filaments 282, 284 and 286, respectively.

Generally, long coiled strands of fiber optic filaments 282, 284 and 286 are preferably utilized as light collecting mechanism 280, wherein the multiple coiling of fiber optic filaments 282, 284 and 286 around filament support 290 and within encasement 238 promotes a maximized surface area in which to capture ambient light passing through transparent encasement 238 and how sight 210 in general. As such, light from all directions can be harnessed from all around fiber optic filaments 282, 284 and 286, thus increasing or magnifying the output of useful light therefrom. Furthermore, fiber optic filaments 282, 284 and 286 preferably emit green, yellow and/or amber light upon harnessing the ambient light, wherein different colors of fiber optic filaments are known within the art and could be utilized in alternate embodiments.

Figure 7:
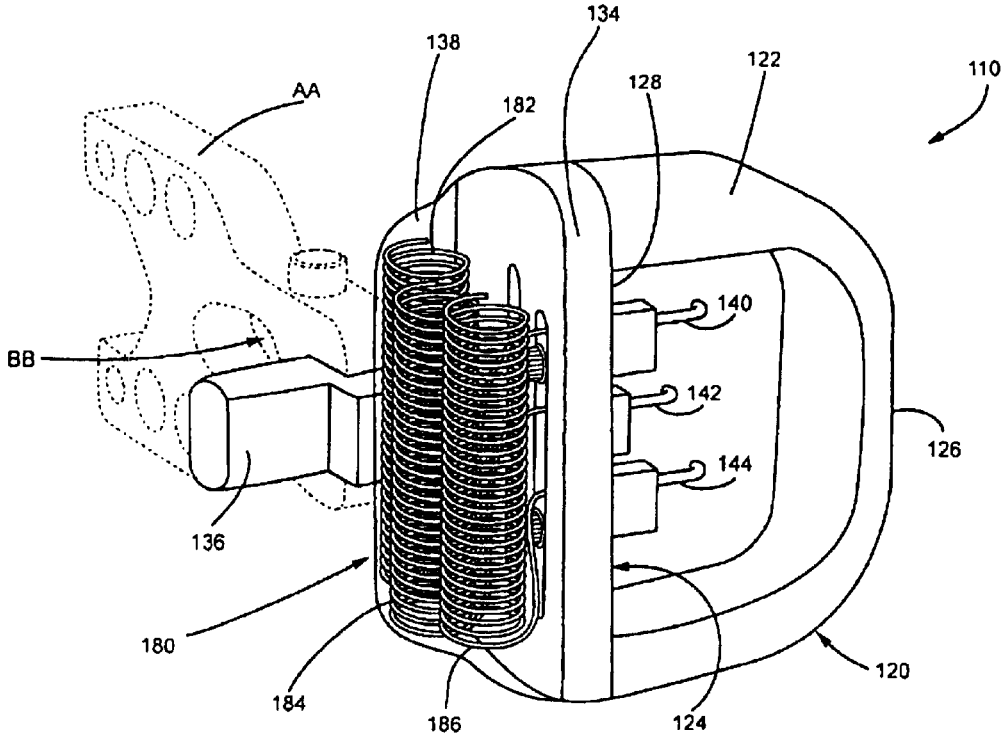
FIG. 7 is a front perspective view of an ambient light collecting bow sight according to an alternate embodiment of the present invention.
Figure 8:
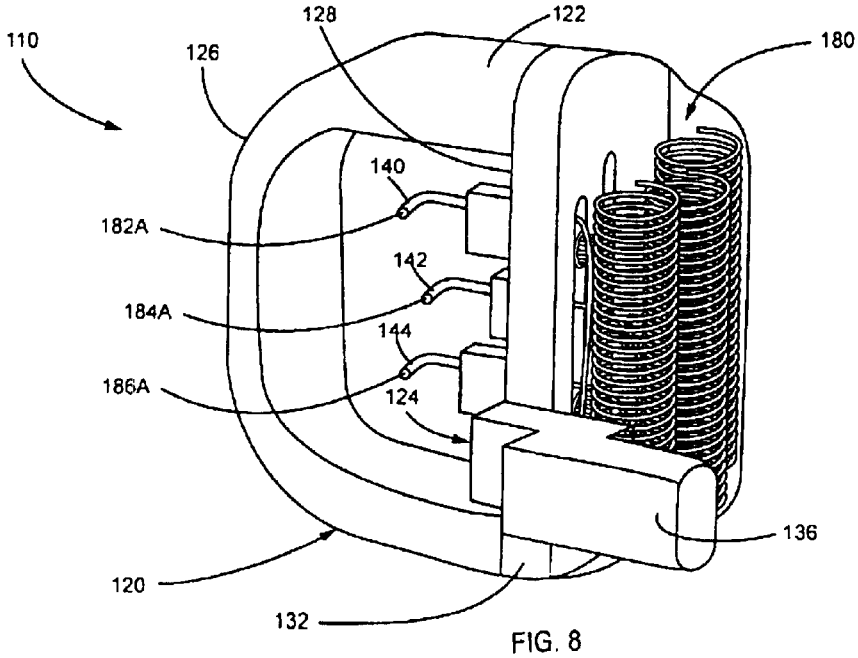
FIG. 8 is a rear perspective view of an ambient light collecting bow sight according to an alternate embodiment of the present invention.
Figure 9:
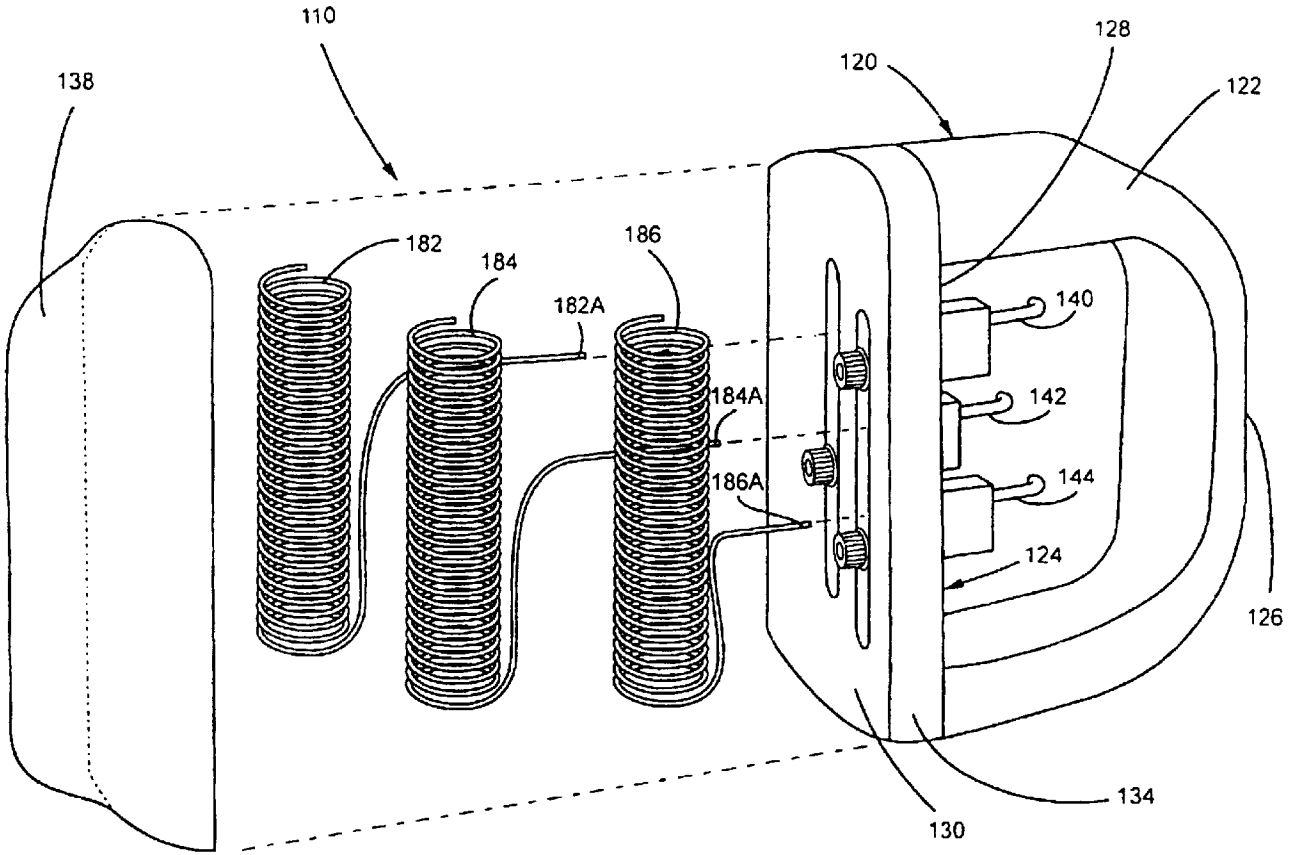
FIG. 9 is an exploded view of an ambient light collecting bow sight according to an alternate embodiment of the present invention.

Referring now to FIGS. 7–9, the present invention according to an alternate embodiment is an ambient light collecting bow sight 110 having bow sight 120 and light collecting mechanism 180.

Specifically, bow sight 120 preferably has generally D-shaped ring 122, wherein D-shaped ring 122 preferably has first wall 124 and curved second wall 126, and wherein first wall 124 preferably has front surface 128, back surface 130 and side walls 132 and 134. Side wall 132 of first wall 124 preferably has substantially Z-shaped shaped shaft 136 integrally formed thereto or attached thereto via any attaching means known within the art, such as, for exemplary purposes only, epoxies or resins. Shaft 136 is preferably dimensioned to be received within an aperture BB in bow sight support AA, wherein bow sight support AA is any conventional bow sight support known within the art. It is contemplated in alternate embodiments that shaft 136 can be any suitable shape and that aperture BB in bow sight support AA can be modified and dimensioned accordingly to properly receive shaft 136 of bow sight 120. Bow sight 120 is preferably formed from a sturdy transparent plastic to enable the passage of light therethrough and to enable the light to be harnessed by light collecting mechanism 180; however, other suitable non-opaque materials can be utilized for bow sight 120.

Back surface 130 of first wall 124 preferably has encasement 138 attached thereto via any known attaching means, wherein encasement 138 houses light collecting mechanism 180. Light collecting mechanism 180 preferably includes three long coiled strands of scintillating ambient light collecting fiber optic filaments 182, 184 and 186, wherein ends 182A, 184A and 186A of filaments 182, 184 and 186, respectively, preferably extend from encasement 138, through first wall 124 and into preferably three hollow sighting pins 140, 142 and 144, respectively. As such, ends 182A, 184A and 186A of fiber optic filaments 182, 184 and 186, respectively, are visible from the ends of hollow sighting pins 140, 142 and 144, respectively, and serve as lit sighting pins upon the capture of ambient light by fiber optic filaments 182, 184 and 186, respectively. Moreover, encasement 138 is preferably formed from a sturdy transparent plastic so as to allow light to pass therethrough and to be harnesses by coiled fiber optic filaments 182, 184 and 186 of light collecting mechanism 180.

Generally, long coiled strands of fiber optic filaments 182, 184 and 186 are preferably employed as light collecting mechanism 180, wherein the multiple coiling of fiber optic filaments 182, 184 and 186 within encasement 138 promote a maximized surface area in which to capture ambient light passing through transparent encasement 138 and bow sight 110. As such, light from a plurality of directions can be harnessed by fiber optic filaments 182, 184 and 186, thus increasing, magnifying and enhancing the output of useful light from light collecting mechanism 180. Furthermore, fiber optic filaments 182, 184 and 186 preferably emit green, yellow and/or amber light upon harnessing the ambient light, wherein different colors of fiber optic filaments are known within the art and may alternatively be utilized.

In an alternate embodiment, bow sight 110 and/or bow sight 210 could possess more or less than three coiled strands of fiber optic filament and thus more or less than three hollow sighting pins.

In another alternate embodiment, bow sight 10 could possess more than one coiled/wrapped strand of fiber optic filament and thus more than one sighting pin.

In an alternate embodiment, bow sights 10, 110 and 210 could be structured in any fashion and/or possess any type of encasement that could house multiple coils/wraps of fiber optic filaments, wherein the ends of the fiber optic filaments could then be fed through or attached to the sighting pin.

In yet another alternate embodiment, insert 38 of bow sight 10 could be rotatable via other rotating means, such as, for exemplary purposes only, ridge-and-channel mechanisms or bearings.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A bow sight, comprising:

a bow sight housing, said bow sight housing having at least one sight pin; and at least one light collecting mechanism [carried by] *coiled a plurality of revolutions around* said bow sight housing, [wherein said at least one light collecting mechanism is coiled a plurality of revolutions] wherein a portion of [the] *said* light collecting mechanism is in communication with said *at least one* sight pin.

2. The bow sight of claim 1, wherein said at least one light collecting mechanism defines a plurality of coil shapes.

3. The bow sight of claim 1, wherein said bow sight housing encases said at least one light collecting mechanism.

4. The bow sight of claim 1, wherein said at least one light collecting mechanism is at least one fiber optic filament.

[5. The bow sight of claim 4, wherein said at least one fiber optic filament is carried in a coil fashion by said bow sight housing.]

6. The bow sight of claim 4 further comprising a support, wherein said at least one fiber optic filament is coiled a plurality of revolutions around said support, said at least one fiber optic filament is at least partially carried by said at least one sight pin, and said support is substantially encased within said bow sight housing.

7. The bow sight of claim 1, wherein said bow sight housing further comprises at least one removable encasement.

8. The bow sight of claim 7, wherein said at least one light collecting mechanism is at least one fiber optic filament.

9. The bow sight of claim 8, wherein said at least one fiber optic filament is coiled a plurality of revolutions within said at least one encasement.

10. The bow sight of claim 8 further comprising a support, wherein said at least one fiber optic filament is coiled a plurality of revolutions around said support, and wherein said support is housed within said at least one encasement.

11. The bow sight of claim 1, wherein said bow sight housing is rotatable.

12. A light collecting bow sight assembly, comprising:

a bow sight, said bow sight being rotatable and having at least one sight pin;

at least one light collector adaptable to said bow sight and coiled a plurality of revolutions wherein a portion of the light collecting mechanisms is in communication with said sight pin; and at least one encasement for housing said at least one light collector upon adapting said at least one light collector to said bow sight.

13. The light collecting bow sight assembly of claim 12, wherein said at least one light collector is at least one optical filament.

14. The light collecting bow sight assembly of claim 13, wherein said at least one optical filament is coiled a plurality of revolutions within said bow sight and is at least partially carried by said at least one sight pin.

15. The light collecting bow sight assembly of claim 13, wherein said at least one fiber optic filament is coiled a plurality of revolutions within said encasement.

16. The light collecting bow sight assembly of claim 15 further comprising a support, wherein said at least one fiber optic filament is coiled a plurality of revolutions around said support, and wherein said support is housed within said at least one encasement.

17. A method of providing an ambient light collecting bow sight, comprising the steps of:

*a. obtaining a bow sight comprising an interior portion and an exterior portion, wherein at least one sight pin is carried by said interior portion;*

[a]*b*. coiling at least one fiber optic filament a plurality of revolutions *around said exterior portion of said bow sight,* wherein a portion of [the light collecting mechanism] *said at least one fiber optic filament* is in communication with said *at least one* sight pin [around a support; and,]

[b. positioning one end of said at least one fiber optic filament within a bow sight].

18. The method of claim 17, wherein said at least one fiber optic filament is a plurality of fiber optic filaments.

19. A bow sight, comprising:

a bow sight housing, said bow sight housing having at least one sight pin;

a first light collecting mechanism carried by said bow sight housing, wherein said first light collecting mechanism is coiled a plurality of revolutions wherein a portion of the light collecting mechanism is in communication with said sight pin;

a second light collecting mechanism carried by said bow sight housing, wherein said second light collecting mechanism is coiled a plurality of revolutions, and wherein said second light collecting mechanism is concentrically disposed to said first light collecting mechanism; and, a third light collecting mechanism carried by said bow sight housing, wherein said third light collecting mechanism is coiled a plurality of revolutions, and wherein said third light collecting mechanism is concentrically disposed to said second light collecting mechanism.

20. The bow sight of claim 19, wherein said first light collecting mechanism emits a first colored light, said second light collecting mechanism emits a second colored light, and said third light collecting mechanism emits a third colored light.

21. The bow sight of claim 19, further comprising a cylindrical support carried by said bow sight housing, wherein said first light collecting mechanism, said second light collecting mechanism and said third light collecting mechanism are coiled a plurality of revolutions around said cylindrical support.

22. The bow sight of claim 19, wherein said first light collecting mechanism, said second light collecting mechanism and said third light collecting mechanism are fiber optic filaments.

* * * * *